(12) United States Patent
Park et al.

(10) Patent No.: US 7,954,469 B2
(45) Date of Patent: Jun. 7, 2011

(54) MAGNETIC BRAKE SYSTEM FOR STARTER MOTOR

(75) Inventors: Dong Ju Park, Fishers, IN (US);
Kook-Ju Lee, Dal-seo Goo (KR);
William Cai, Carmel, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 14 days.

(21) Appl. No.: 12/230,755

(22) Filed: Sep. 4, 2008

(65) Prior Publication Data

US 2010/0050971 A1  Mar. 4, 2010

(51) Int. Cl.
*F02N 11/00* (2006.01)
*F02N 15/02* (2006.01)

(52) U.S. Cl. ........ 123/179.25; 74/7 C; 74/7 E; 290/38 C

(58) Field of Classification Search ............. 123/179.25; 290/38 R, 38 C; 74/6, 7 C, 7 E
See application file for complete search history.

(56) References Cited

U.S. PATENT DOCUMENTS

| | | | |
|---|---|---|---|
| 2,839,935 A * | 6/1958 | Hartzell et al. | 74/6 |
| 4,308,462 A * | 12/1981 | McMillen | 290/38 R |
| 4,525,632 A * | 6/1985 | Tanaka | 290/38 R |
| 4,776,224 A | 10/1988 | Maezawa et al. | |
| 5,159,908 A | 11/1992 | Eyermann et al. | |
| 5,195,389 A | 3/1993 | Isozumi | |
| 5,474,152 A | 12/1995 | Wilkinson et al. | |
| 5,823,048 A | 10/1998 | Saupe | |
| 5,848,552 A | 12/1998 | Mine et al. | |
| 6,466,116 B1 | 10/2002 | Ho et al. | |
| 6,937,122 B2 | 8/2005 | Ho et al. | |
| 7,275,509 B2 | 10/2007 | Kassner | |

FOREIGN PATENT DOCUMENTS

| | | | |
|---|---|---|---|
| JP | 02136562 A | * | 5/1990 |
| WO | WO 2008085931 A2 | * | 7/2008 |

OTHER PUBLICATIONS

English Translation of JP 02136562 A.*

* cited by examiner

*Primary Examiner* — Stephen K Cronin
*Assistant Examiner* — Anthony L Bacon
(74) *Attorney, Agent, or Firm* — Finnegan, Henderson, Farabow, Garrett & Dunner, LLP

(57) ABSTRACT

An engine starter system is disclosed. The starter system includes an electric cranking motor having a shaft and configured to crank the engine. The starter system further includes a planetary-type reduction gear unit that has a starter motor ring gear. The starter system has a pinion mechanism mounted on the shaft and configured to selectively engage a ring gear of the engine. A clutch assembly is configured to transmit torque between the shaft and the pinion mechanism. The clutch assembly includes a current conducting material and the starter motor ring gear includes one or more permanent magnets. The starter system employs the principle of Lenz's law to reduce the overrunning rotational speed of the cranking motor upon disengagement of the pinion mechanism from the engine's ring gear after the engine has started.

17 Claims, 5 Drawing Sheets

MAGNETIC BRAKE SYSTEM FOR STARTER MOTOR

TECHNICAL FIELD

The present disclosure relates generally to internal combustion engines, and more particularly to a magnetic brake system for a starter motor of an internal combustion engine.

BACKGROUND

Generally, overrunning clutches are used in starter assemblies. The overrunning type clutch transmits torque in one direction and is freewheeling in the opposite direction. The starter utilizes a gear reduction of the output of the starter's cranking motor to produce the high starting torque necessary in some applications to start an engine. When the engine starts, it instantaneously accelerates towards its running speed forcing the clutch of the starter to overrun due to the clutch's output rotating slower than engine input rpm. In automotive engines, the starter is moved out of contact with the ring gear of the engine so that the starter only operates at the high engine speed for a very short period of time.

More specifically, the starter's pinion is clutched to drive shaft of the crank motor through the overrunning clutch, which permits the pinion to transmit drive in only one direction. In this manner, the drive is energized through the pinion to the engine flywheel ring gear. However, if the pinion remains engaged with the ring gear, for example, because an operator fails to release the key as soon as the engine starts, the running engine causes the crank motor to spin excessively. During such overrunning time a "coast down" noise occurs until the armature of the cranking motor stops rotating. This coast down noise is significantly undesirable, particularly in automotive engines.

The present disclosure is directed towards overcoming one or more of the problems set forth above.

SUMMARY

In one aspect, the present disclosure is directed to a starter assembly. The starter assembly includes a starter motor having a shaft and configured to crank an engine. The starter assembly further includes a planetary-type reduction gear unit having a starter motor ring gear. A pinion mechanism is mounted on the shaft and is configured to selectively engage a ring gear of the engine. A clutch assembly is configured to transmit torque between the shaft and the pinion mechanism. The clutch assembly includes a current conducting material and the starter motor ring gear includes one or more permanent magnets.

In another aspect, the present disclosure is directed to a method of slowing down overrunning of a starter system. The method includes mounting a pinion mechanism on a shaft of a starter motor configured to crank an engine. The method further includes engaging selectively, a ring gear of the starter motor, the ring gear of the starter motor including one or more permanent magnets. The method also includes transmitting torque between the shaft and the pinion mechanism by a clutch assembly that includes a current conducting material, and disengaging the pinion mechanism from engine cranking.

In another aspect, the present disclosure is directed to a machine having a combustion engine and configured to power operations of the machine. The machine includes an interface that is configured to receive an input from a machine operator to start the engine. The machine further includes a starter motor having a shaft and configured to crank the engine. The machine further includes a planetary-type reduction gear unit including a starter motor ring gear. The machine also includes a pinion mechanism mounted on the shaft and configured to selectively engage a ring gear of the engine, and a clutch assembly configured to transmit torque between the shaft and the pinion assembly. The clutch assembly includes a current conducting material and the starter motor ring gear includes one or more permanent magnets.

In a further aspect, the present disclosure is directed to a starter assembly. The starter assembly includes a starter motor having a shaft and configured to crank an engine. The starter assembly further includes a planetary-type reduction gear unit having a starter motor ring gear. The starter assembly also includes a pinion mechanism that is mounted on the shaft and configured to selectively engage a ring gear of the engine. A clutch assembly is configured to transmit torque between the shaft and the pinion mechanism. The clutch assembly includes a current conducting material and the starter motor ring gear includes one or more permanent magnets.

DETAILED DESCRIPTION

Figure 1:
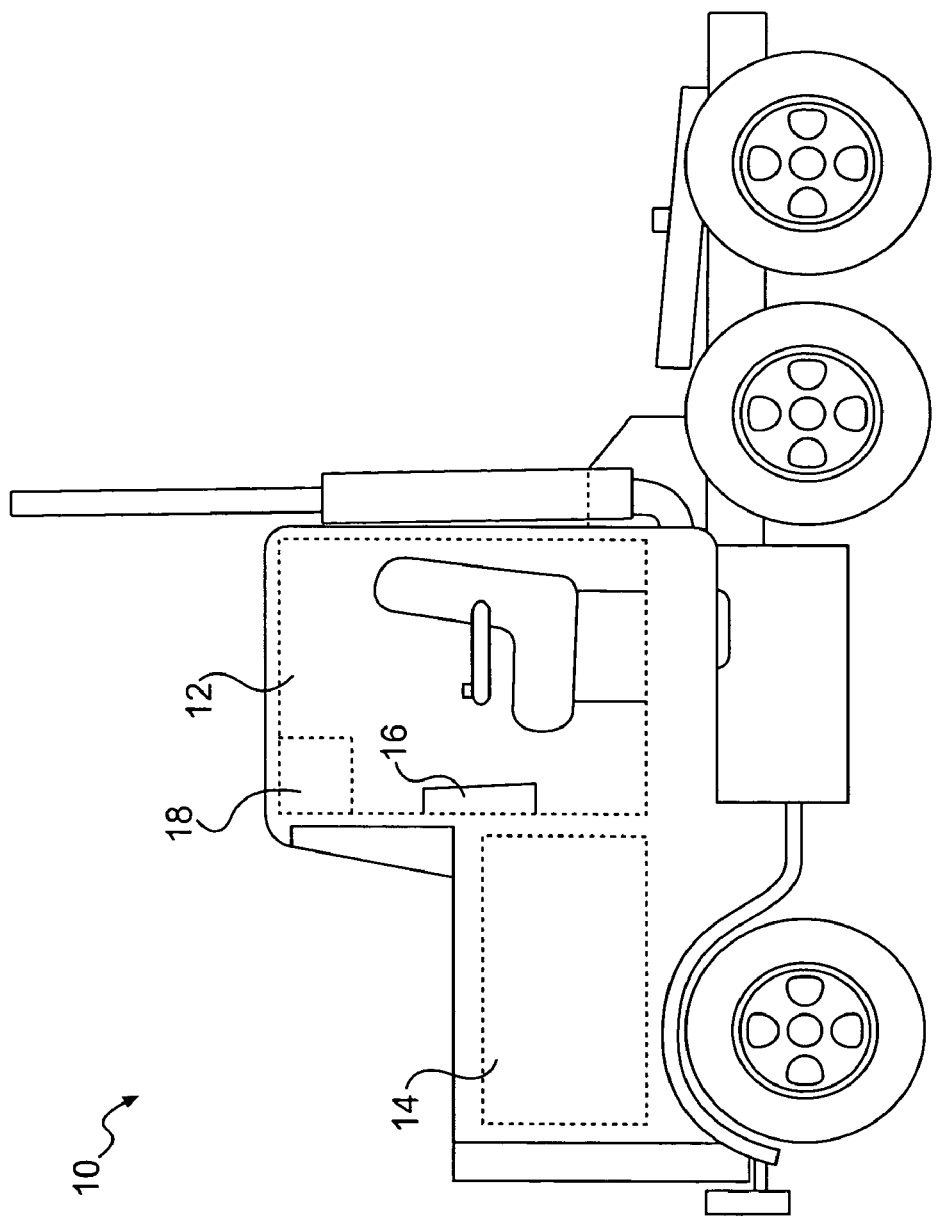
FIG. 1 is a diagrammatic view of a machine, according to an exemplary disclosed embodiment.

FIG. 1 provides a diagrammatic view of a machine 10 according to an exemplary disclosed embodiment. Machine 10 may include a cab 12 and an engine 14. While machine 10 may be an on-highway truck, it is contemplated that the present disclosure may be applicable to any other machine that has an engine. For example, machine 10 may include off-highway vehicles, passenger cars, construction equipment, earth-moving equipment, and generator sets.

Figure 2:
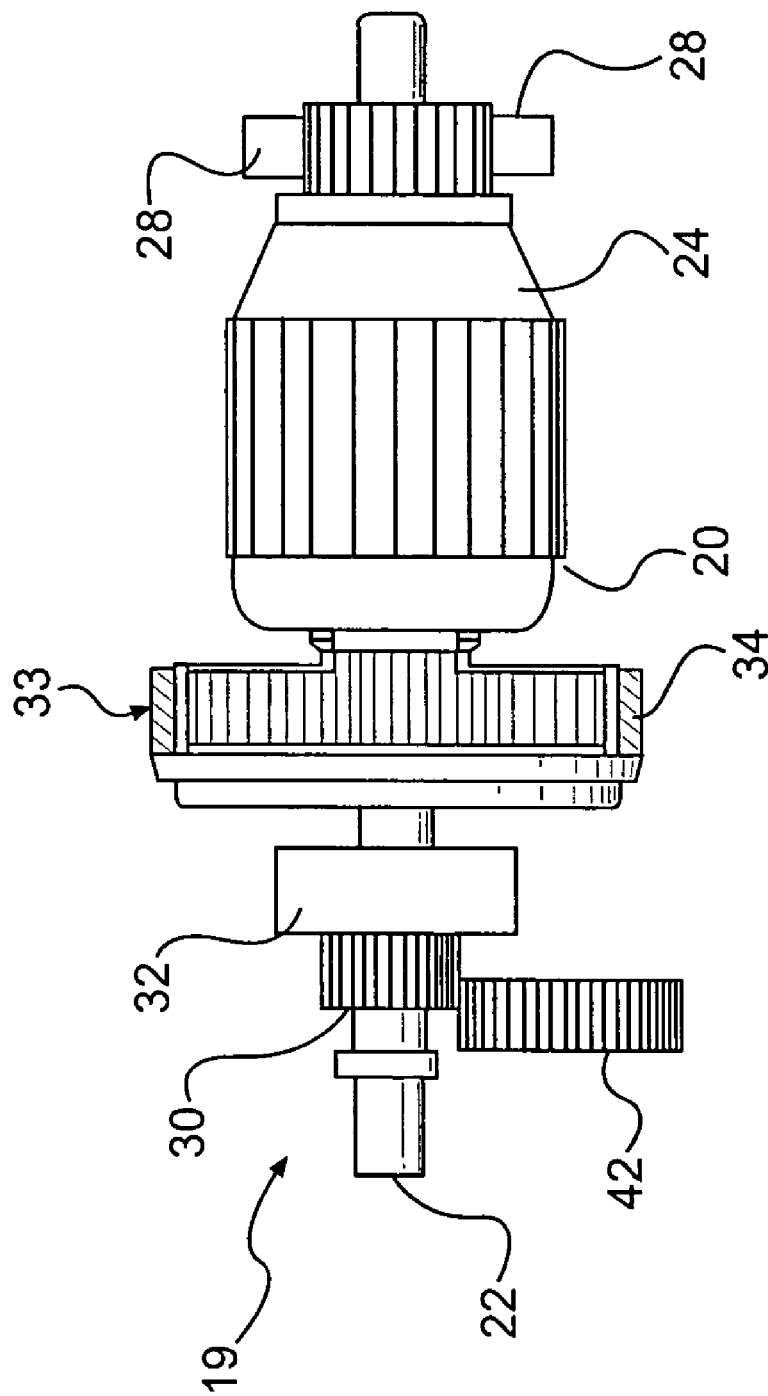
FIG. 2 is a diagrammatic view of a drive system, according to an exemplary disclosed embodiment.

Engine 14 may include an internal combustion engine that operates using diesel fuel, gasoline, gaseous fuels, or other types of fuel as well as hybrid engine systems that run on a combination of fuel and electrical power. It is contemplated that engine 14 may provide power for operation of machine 10, including electrical power to run devices inside cab 12 and elsewhere on machine 10. Engine 14 may have functional relationships with other machine components such as, for example, a starter system 19. As shown in FIG. 2, starter system 19 may include a starter motor 20 and a planetary-type reduction gear unit 33.

Starter motor 20 may include a shaft 22 and an armature 24. The motor 20 may be a DC permanent magnet type motor or any type of motor appreciable to an ordinarily skilled artisan. Starter motor 20 may include a commutator with brushes 28. The brushes 28 may be carbon brushes or any type of brush appreciable to one of ordinary skill in the art.

Planetary-type reduction gear unit 33 that includes a starter motor outer ring 34 may be mounted on shaft 22 and may be configured such that the torque of armature 24 is transmitted to the reduction gear. A pinion mechanism 30 and a clutch assembly 32 may also be mounted on shaft 22 of starter motor 20.

Pinion mechanism 30 may be configured to mesh with a suitable gear, such as the ring gear 42 of engine 14, to provide rotational power to start engine 14. Although pinion mechanism 30 is shown to be in mesh with engine ring gear 42, pinion mechanism 30 may rotate freely and does not have to be meshed with engine ring gear 42.

Figure 3:
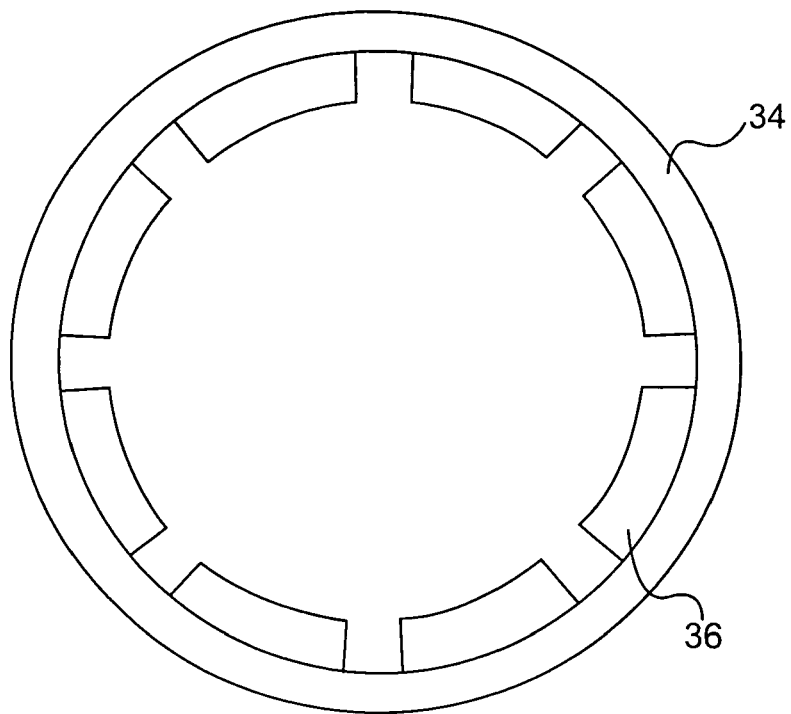
FIG. 3 is a diagrammatic view of a ring gear, according to an exemplary disclosed embodiment.

Starter motor ring gear 34 may be constructed of low carbon steel or any suitable material. As shown in FIG. 3, permanent magnets 36 may be imbedded in starter motor ring gear 34. One or more permanent magnets may be used, and the magnets may be located in any suitable location on starter motor ring gear 34 or any location on starter motor 20 as one of ordinary skill would appreciate.

Figure 4:
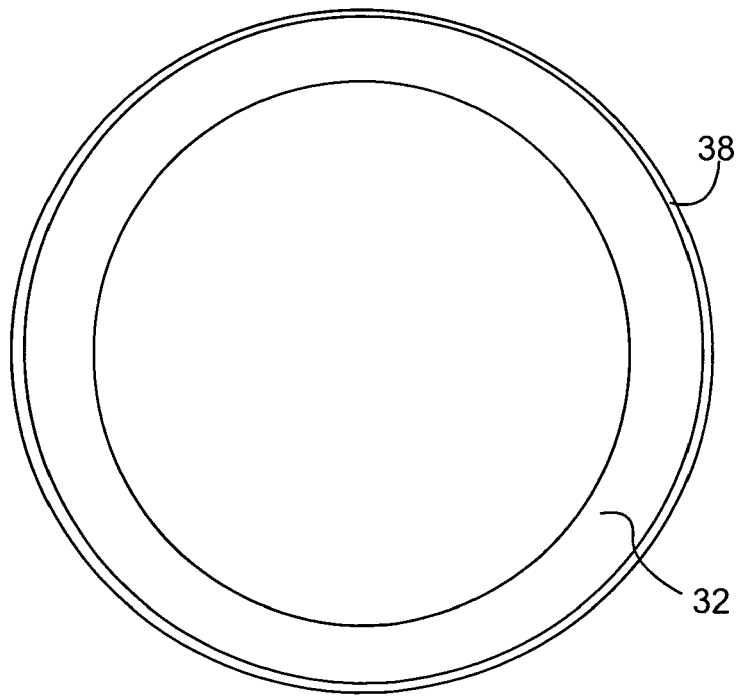
FIG. 4 is a diagrammatic view of a clutch assembly, according to an exemplary disclosed embodiment.

Clutch assembly 32 may also be constructed from low carbon steel or any suitable material. The clutch assembly 32 may be any suitable clutch known in the art such as a roller type overrunning clutch. A current conducting material 38 such as copper may be included with overrunning clutch 32 as shown in FIG. 4. The current conducting material 38 may be located on an outer periphery of the clutch assembly 32 and form a band around the clutch assembly 32. One of ordinary skill in the art would appreciate that any suitable current conducting material 38 may be used and the current conducting material may be located in any suitable location on the clutch assembly or any location on starter motor 20 as one of ordinary skill would appreciate. An ordinarily skilled artisan would appreciate that the entire clutch assembly may be constructed from a suitable current conducting material.

Figure 5:
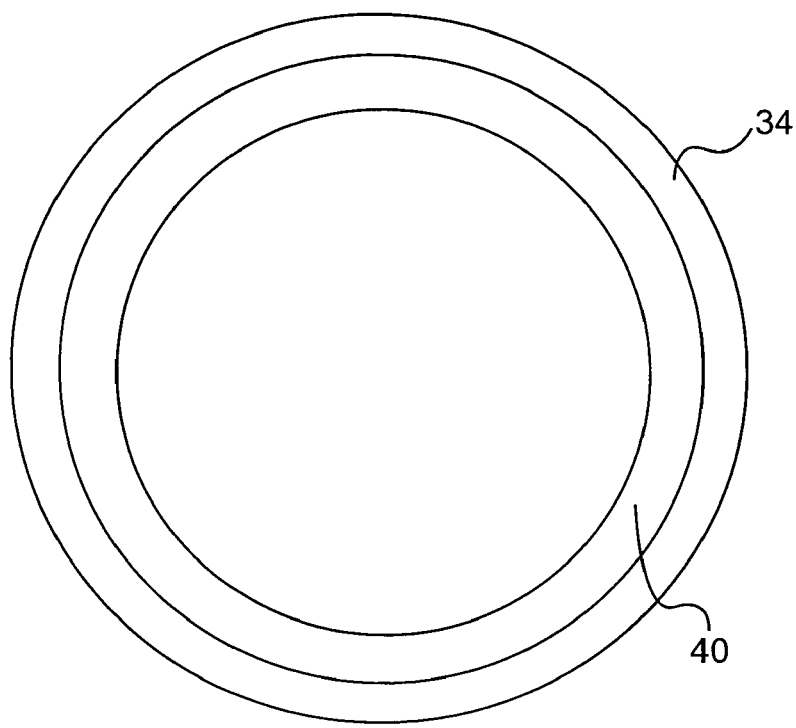
FIG. 5 is a diagrammatic view of a ring gear, according to another disclosed embodiment.
Figure 6:
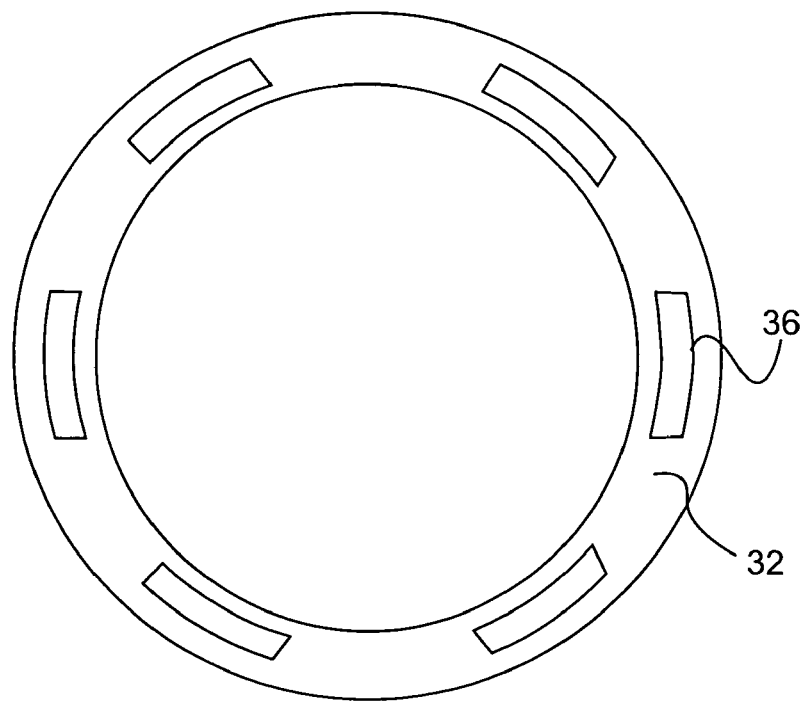
FIG. 6 is a diagrammatic view of a clutch assembly, according to another disclosed embodiment.

In an alternate embodiment, starter motor ring gear 34 may be constructed from a current conducting material such as low carbon steel and a current conducting material such as copper band 40 as shown on FIG. 5. One or more permanent magnets 36 may then be imbedded with the clutch assembly 32 in any suitable location, an example of which is shown in FIG. 6 any suitable location on starter motor ring gear 34.

Cab 12 may include an enclosed area of machine 10 configured to house the operator. Cab 12 may also include an operator interface 16 that may contain dials and/or controls for conveying information and for operating machine 10 and its various components and a controller 18 as shown in FIG. 1. Interface 16 may include a monitor, a touch-screen, a portable hand-held device, a keypad, a control panel, a keyboard, an off-board command and control system, and/or other suitable input devices. Interface 16 may receive input from a machine operator and generate corresponding command signals in response to the input, which may be communicated to controller 18 for processing and/or execution. In one aspect, interface 16 may include a starter mode selection device such as, for example, a knob, a dial, a selector switch, one or more buttons, etc., allowing the operator to select an automatic starter mode and a manual starter mode. In response to an operator's selection of a desired starter mode, interface 16 may communicate a corresponding selection signal to controller 18.

Interface 16 may also include means for receiving a machine operator's request to start engine 14 and for generating a corresponding start request signal. The means for receiving and generating may include a magnetic switch configured to receive a coded key containing magnetic information, a memory chip embedded, a radio-frequency identification circuit (RFID), a keypad allowing the code to be manually entered by an operator, a data port allowing direct communication with a service tool or a computer having the code, an antenna allowing reception of the code from a remote location, a scanner configured to read coded indicia, or any other configuration that can receive the code and generate a signal indicative of the code. Interface 16 may also display data relating to machine and/or starter status in response to signals from controller 18.

Starting of engine 14 may be regulated by controller 18. Controller 18 may include, for example, an electronic control module (ECM) or another processor capable of executing, and/or or outputting command signals in response to received and/or stored data. Controller 18 may include computer-readable storage, such as read-only memories (ROM), random-access memories (RAM), and/or flash memory; one or more secondary storage devices, such as a tape-drive and/or magnetic disk drive; one or more microprocessor (CPU); and/or any other components for running an application and processing data. The microprocessor(s) may comprise any suitable combination of commercially-available or specially-constructed microprocessors for controlling system operations. As such, controller 18 may include instructions and/or data stored as hardware, software, and/or firmware within the memory, secondary storage device(s), and/or microprocessor (s). Alternatively or additionally, controller 18 may include and/or be associated with various other suitably arranged hardware and/or software components. For example, controller 18 may include power supply circuitry, signal conditioning circuitry, solenoid driver circuitry, amplifier circuitry, timing circuitry, filtering circuitry, switches, and/or other types of circuitry, if desired.

Controller 18 may include one or more data storage structures in the computer-readable medium containing predetermined data to facilitate starter control determinations in connection with an algorithm of machine 10. The data storage structures may include, for example, arrays matrices, tables, variable classes, etc. The predetermined data may be based on known machine and/or starter control system performance specifications, such as those of engine 14 and starter motor 20. The predetermined data may be derived from performance test results, engineering knowledge, and/or other resources. For example, the data storage may include an appropriate engine speed at which ignition should take place, lookup tables defining the amounts of electrical current, fluid displacement rates, and/or pressures required to provide an appropriate torque to start engine 14.

Controller 18 may also receive a signal from operator interface 16 indicating selection of an automatic start mode or selection of a manual start mode to initiate starting of engine 14. Controller 18 may further receive a signal from operator interface 16 indicative of the operator's request to start engine 14 (e.g., turning a key and/or pressing a button).

Figure 7:
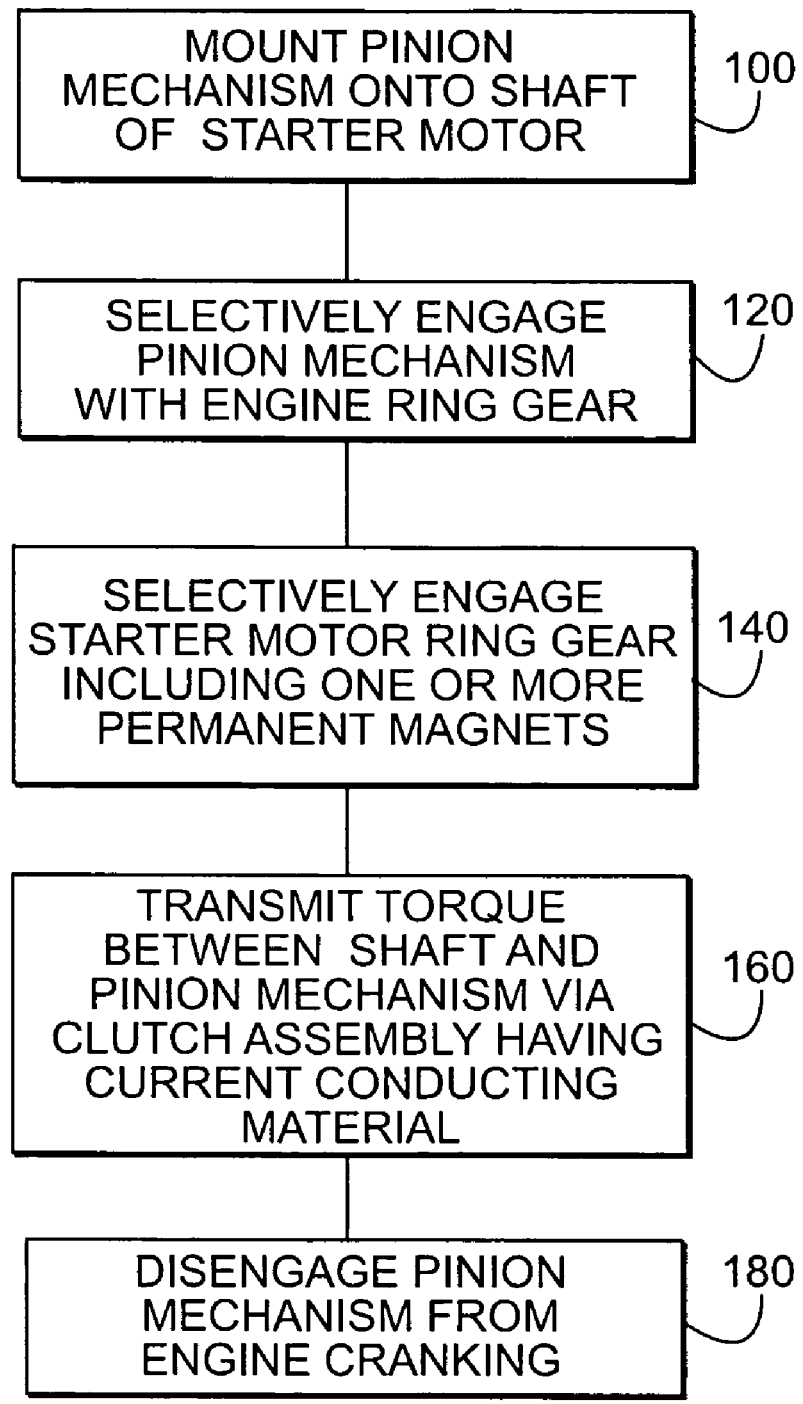
FIG. 7 is a flow diagram of a method, according to an exemplary disclosed embodiment.

FIG. 7 illustrates an exemplary method of slowing down drive system 19. FIG. 7 will be described in detail in the following section.

INDUSTRIAL APPLICABILITY

The disclosed starter system 19 may have wide application in a variety of engine types including, for example, diesel engines, gasoline engines, and gaseous fuel powered engines and may be implemented into any engine appreciable to an ordinarily skilled artisan.

The pinion mechanism 30 may be mounted onto the shaft 22 (step 100) and may be configured to selectively engage the ring gear 42 of engine 14 (step 120) to initiate cranking engine 14. Starter motor ring gear 34, including one or more permanent magnets may be selectively engaged (step 140). Torque may be transmitted between shaft 22 and the pinion mechanism 30 via a clutch assembly 32 (step 160). Once engine 14 starts, engine ring gear 42 may be disengaged from the pinion mechanism 30 (step 180) and rotation of starter motor 20 may come to a stop.

Braking of starter motor 20 is enhanced and overrunning speed is reduced because a portion of starter motor ring gear 34 or clutch assembly 32 includes either permanent magnets or a conducting material such as copper. Preferably, when a portion of the starter motor ring gear 34 includes permanent magnets, the clutch assembly 32 includes a conducting material. The conducting material may be located on an outer periphery of the clutch assembly 32. It should be noted that the permanent magnets may be included with the clutch assembly 32 while the conducting material is included with the starter motor ring gear 34.

Lenz's law provides that when an emf (voltage) is generated by a change in magnetic flux, the induced emf is such that it produces a current whose magnetic field opposes the change which produces it. Eddy currents are caused when a conductor is exposed to a changing magnetic field due to relative motion of the field source and conductor. According to Lenz's law, the current swirls in a plane perpendicular to the magnetic field and creates electromagnets with magnetic fields that oppose the change of the magnetic field. Eddy currents can generate strong repulsive forces between the conductor and the field source, which can provide a strong braking effect.

Because clutch assembly 32 may include a conducting material 38 while the ring gear 34 includes permanent magnets 36, when the ring gear is disengaged from the pinion assembly (step 180), the conducting material 38 becomes exposed to the magnetic field from the permanent magnets 36 and eddy currents are generated within conducting material 38. The eddy currents operate to slow down the starter system 19 as they oppose the rotational force of the drive system as described above and cause it to lose energy. The faster the overrunning drive spins, the stronger the effect of the eddy currents. Thus, armature 24 slows down, reducing coast down noise and enhancing brush 28 life.

It will be apparent to those skilled in the art that various modifications and variations can be made to the disclosed system and method without departing from the scope of the disclosure. Additionally, other embodiments of the disclosed system and methods will be apparent to those skilled in the art from consideration of the specification. It is intended that the specification and examples be considered as exemplary only, with a true scope of the disclosure being indicated by the following claims and their equivalents.

What is claimed is:

1. A starter assembly, comprising:
   a starter motor having a shaft and configured to crank an engine;
   a planetary-type reduction gear unit including a starter motor ring gear, the ring gear including a permanent magnet;
   a pinion mechanism mounted on the shaft and configured to selectively engage a ring gear of the engine;
   a clutch assembly made of a first material and configured to transmit torque between the shaft and the pinion mechanism;
   wherein the periphery of the clutch assembly made of the first material is surrounded by a band of current conducting material different from the first material; and
   wherein the permanent magnet and the current conducting material are configured such that interaction therebetween reduces the speed of the electric motor upon disengagement of the pinion mechanism from engine cranking.

2. The starter assembly of claim 1, wherein the current conducting material includes copper.

3. The starter assembly of claim 1, wherein eddy currents in the current conducting material of the clutch assembly operate to reduce the speed of the electric motor upon disengagement of the pinion mechanism from engine cranking.

4. The starter assembly of claim 1, wherein the permanent magnet includes a plurality of magnets embedded in the starter motor ring gear.

5. The starter assembly of claim 1, wherein a side of the permanent magnet facing the clutch assembly is free from engagement with another magnet.

6. The starter assembly of claim 1, wherein the first material is low carbon steel and the current conducting material is copper.

7. A method of slowing down overrunning of a starter system, including:
   mounting a pinion mechanism on a shaft of a starter motor configured to crank an engine;
   engaging selectively, a ring gear of the starter motor, the ring gear of the starter motor including one or more permanent magnets;
   transmitting torque between the shaft and the pinion mechanism by a clutch assembly, the clutch assembly including a first material and a second current conducting material, wherein the second current conducting material forms a band around the periphery of the first material; and
   disengaging the pinion mechanism from engine cranking;
   wherein said disengaging the pinion mechanism from engine cranking further includes exposing the current conducting material of the clutch assembly to the one or more permanent magnets of the ring gear of the starter motor such that interaction therebetween reduces the speed of the electric motor.

8. The method of claim 7, wherein the second current conducting material includes copper.

9. The method of claim 7, further including eddy currents in the second current conducting material of the clutch assembly operating to reduce the speed of the starter motor upon disengagement of the pinion mechanism from engine cranking.

10. The method of claim 7, wherein the ring gear of the starter motor is included in a planetary-type reduction gear unit further including a sun gear and at least one planetary gear.

11. A machine, comprising:
    a combustion engine configured to power operations of the machine;
    an interface configured to receive input from a machine operator to start the engine;
    a starter motor having a shaft and configured to crank the engine;
    a planetary-type reduction gear unit including a starter motor ring gear, a sun gear, and at least one planetary gear, wherein the ring gear includes at least one permanent magnet;
    a pinion mechanism mounted on the shaft and configured to selectively engage a ring gear of the engine;
    a clutch assembly made of a first material and configured to transmit torque between the shaft and the pinion assembly; and wherein the periphery of the clutch assembly made of the first metal is surrounded by a band of current conducting material different from the first material; and wherein the at least one permanent magnet and the current conducting material are configured such that interaction therebetween reduces the speed of the electric motor upon disengagement of the pinion mechanism from engine cranking.

12. The machine of claim 11, wherein the current conducting material includes copper.

13. The machine of claim 11, wherein eddy currents in the current conducting material of the clutch assembly operate to reduce the speed of the electric motor upon disengagement of the pinion mechanism from engine cranking.

14. A starter assembly, comprising:
a starter motor having a shaft and configured to crank an engine;
a planetary-type reduction gear unit including a starter motor ring gear, the starter motor ring gear made of a first material;
a pinion mechanism mounted on the shaft and configured to selectively engage a ring gear of the engine;
a clutch assembly configured to transmit torque between the shaft and the pinion mechanism;

wherein a radial inner surface of the starter motor ring gear made of the first material includes a band of current conducting material different than the first material, and the clutch assembly includes one or more permanent magnets; and wherein the one or more permanent magnets and the current conducting material are configured such that interaction therebetween reduces the speed of the electric motor upon disengagement of the pinion mechanism from engine cranking.

15. The starter assembly of claim 14, wherein the starter motor ring gear is constructed from low carbon steel.

16. The starter assembly of claim 14, wherein eddy currents in the current conducting material of the clutch assembly operate to reduce the speed of the electric motor upon disengagement of the pinion mechanism from engine cranking.

17. The starter assembly of claim 14, wherein the permanent magnets are embedded in the clutch assembly.

* * * * *